(12) United States Patent
Tormasov

(10) Patent No.: US 8,397,306 B1
(45) Date of Patent: Mar. 12, 2013

(54) SECURITY DOMAIN IN VIRTUAL ENVIRONMENT

(75) Inventor: Alexander G. Tormasov, Moscow (RU)

(73) Assignee: Parallels IP Holdings GmbH, Schaffhausen (*) Notice: Subject to any disclaimer, the term of this patent is extended or adjusted under 35 U.S.C. 154(b) by 294 days.

(21) Appl. No.: 12/889,302

(22) Filed: Sep. 23, 2010

Related U.S. Application Data

(60) Provisional application No. 61/245,251, filed on Sep. 23, 2009.

(51) Int. Cl.
G06F 7/04 (2006.01)

(52) U.S. Cl. ............ 726/27; 726/14; 726/15; 713/164; 713/166; 713/167

(58) Field of Classification Search .................. 726/27, 726/15; 713/64, 65, 66; 711/163
See application file for complete search history.

(56) References Cited

U.S. PATENT DOCUMENTS

| | | | | |
|---|---|---|---|---|
| 6,005,942 | A * | 12/1999 | Chan et al. ................ | 713/187 |
| 8,220,031 | B2 * | 7/2012 | Leterrier et al. ............ | 726/2 |
| 2004/0148480 | A1 * | 7/2004 | Watt et al. ................. | 711/163 |
| 2004/0260910 | A1 * | 12/2004 | Watt et al. ................. | 712/43 |
| 2004/0260941 | A1 * | 12/2004 | Fearnley et al. ........... | 713/201 |
| 2005/0108532 | A1 * | 5/2005 | Bajikar ...................... | 713/171 |
| 2005/0114616 | A1 * | 5/2005 | Tune et al. ................. | 711/163 |
| 2007/0136603 | A1 * | 6/2007 | Kuecuekyan ............... | 713/185 |
| 2008/0005794 | A1 * | 1/2008 | Inoue et al. ................ | 726/22 |
| 2008/0082772 | A1 * | 4/2008 | Savagaonkar et al. ..... | 711/163 |
| 2008/0148048 | A1 * | 6/2008 | Govil et al. ................ | 713/164 |
| 2008/0244206 | A1 * | 10/2008 | Heo et al. .................. | 711/163 |
| 2008/0263676 | A1 * | 10/2008 | Mo et al. ................... | 726/28 |
| 2009/0172318 | A1 * | 7/2009 | Sugai et al. ................ | 711/159 |
| 2009/0204964 | A1 * | 8/2009 | Foley et al. ................ | 718/1 |
| 2009/0320048 | A1 * | 12/2009 | Watt et al. ................. | 719/319 |
| 2010/0057960 | A1 * | 3/2010 | Renno ....................... | 710/110 |
| 2010/0122314 | A1 * | 5/2010 | Zhang et al. ............... | 726/1 |
| 2010/0228936 | A1 * | 9/2010 | Wright et al. .............. | 711/163 |
| 2011/0010712 | A1 * | 1/2011 | Thober et al. .............. | 718/1 |
| 2011/0047542 | A1 * | 2/2011 | Dang et al. ................ | 718/1 |
| 2011/0047543 | A1 * | 2/2011 | Mohinder .................. | 718/1 |
| 2012/0036299 | A1 * | 2/2012 | Renno ....................... | 710/262 |

OTHER PUBLICATIONS

Stumpf et al. "Enhancing Trust Platform Modules with Hardware-Based Virtualization Techniques," 2008, IEEE, pp. 1-9.*
Clair et al., "Establishing and Sustaining System Integrity via Root of Trust Installation," 2007, IEEE, pp. 19-30.*
Demchenko et al., "Extending User-Control Security Domain with TPM/TCG in Grid-based Virtual Collaborative Environment," 2007, IEEE, pp. 57-66.*
Gebhardt et al., "Secure Virtual Disk Images for Grid Computing," 2008, IEEE, p. 19-30.*

* cited by examiner

*Primary Examiner* — Luu Pham
(74) *Attorney, Agent, or Firm* — Bardmesser Law Group

(57) ABSTRACT

A system, method and computer program product for an isolated security domain which is a bounded area of the VM for protected objects. The objects are software units (including executable code data), hardware units (e.g., ports) or a combination thereof. The secure units in this area are accessible using secure rules used to ensure that objects are not malware. Authentication for connections to security domain is required and certain areas of the domain are made to be read only.

31 Claims, 4 Drawing Sheets

SECURITY DOMAIN IN VIRTUAL ENVIRONMENT

CROSS-REFERENCE TO RELATED APPLICATION

This application is a non-provisional application of U.S. Provisional Patent Application No. 61/245,251, filed Sep. 23, 2009, entitled SECURITY DOMAIN IN VIRTUAL ENVIRONMENT, which is incorporated by reference herein in its entirety.

BACKGROUND OF THE INVENTION

1. Field of the Invention

The present invention is related to virtualization technology, and more particularly, to implementing a security domain in Virtual Environment.

2. Description of the Related Art

The industry trend of virtualization and isolation of computer system resources presents two major challenges—virtualization at software level and virtualization at hardware level. A Virtual Machine (VM) is a type of an isolated Virtual Environment where multiple VMs can run on the same physical machine simultaneously. Each VM instance has a set of its own software components and uses hardware modules of the physical machine where the VM resides.

Typically, there are multiple VMs created on a host operating system. In such system, some resources of the host operating system can be isolated and allocated for running each of the VMs. An example of this type of system is a computing environment provided by VMware™. The VMware™ solution provides standardized isolated secured computing environments. This product is typically used as an enterprise-level solution, where a number of VMware™ Virtual Machines are distributed throughout the computer system. However, the VMware™ solution does not provide adequate support for using system hardware for support and acceleration of the VMs.

Virtualization allows running a number of VMs on the same physical machine. Examples of conventional virtualization solutions are virtual systems by VMware™, Parallels Software International, Inc., Microsoft Virtual Server, Microsoft/Citrix Terminal Server, Virtuozzo™ by SWSoft (Parallels), Xen systems by XenSource, Solaris Zones, etc. All of these systems, however, provide only limited support for a low level (i.e., hardware) virtualization.

With Virtual Machine (VM) technology, a user can create and run multiple virtual environments on a physical server at the same time. Each virtual environment (such as VM), requires its own operating system (OS) and can run applications independently. The VM software provides a layer between the computing, storage, and networking hardware and the software that runs on it.

When an application is executed inside the Virtual Environment (such as VM or container) it is not clear whether the application is secure and is not going to cause any damage to the Host OS. A trusted boot can be used for tracking security in the Virtual Environment. However, this requires loading of special modules into the Guest system that takes a long time for these modules to detect some potentially dangerous activity. Meanwhile, a user cannot be assured that a Host and/or Guest system is not compromised.

Therefore, it is desirable to have a security domain of objects in a Virtual Environment that can be verified to be clean and temporarily protected for the existence of the security domain.

SUMMARY OF THE INVENTION

The present invention is intended as a method and system for implementing a security domain in Virtual Environment that substantially obviates one or several of the disadvantages of the related art.

In one aspect of the invention, there is provided a system, method and computer program product for implementing a security domain on a Virtual Machine (VM) or a container running on a host computer system.

According to an exemplary embodiment, an isolated security domain is a bounded area of the VM for protected objects. The objects are software units (including executable code data), hardware units (e.g., ports) or a combination thereof. The secure units in this area are accessible using secure rules used to ensure that objects are not malware. Authentication for connections to security domain is required and certain areas of the domain are made to be read only.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
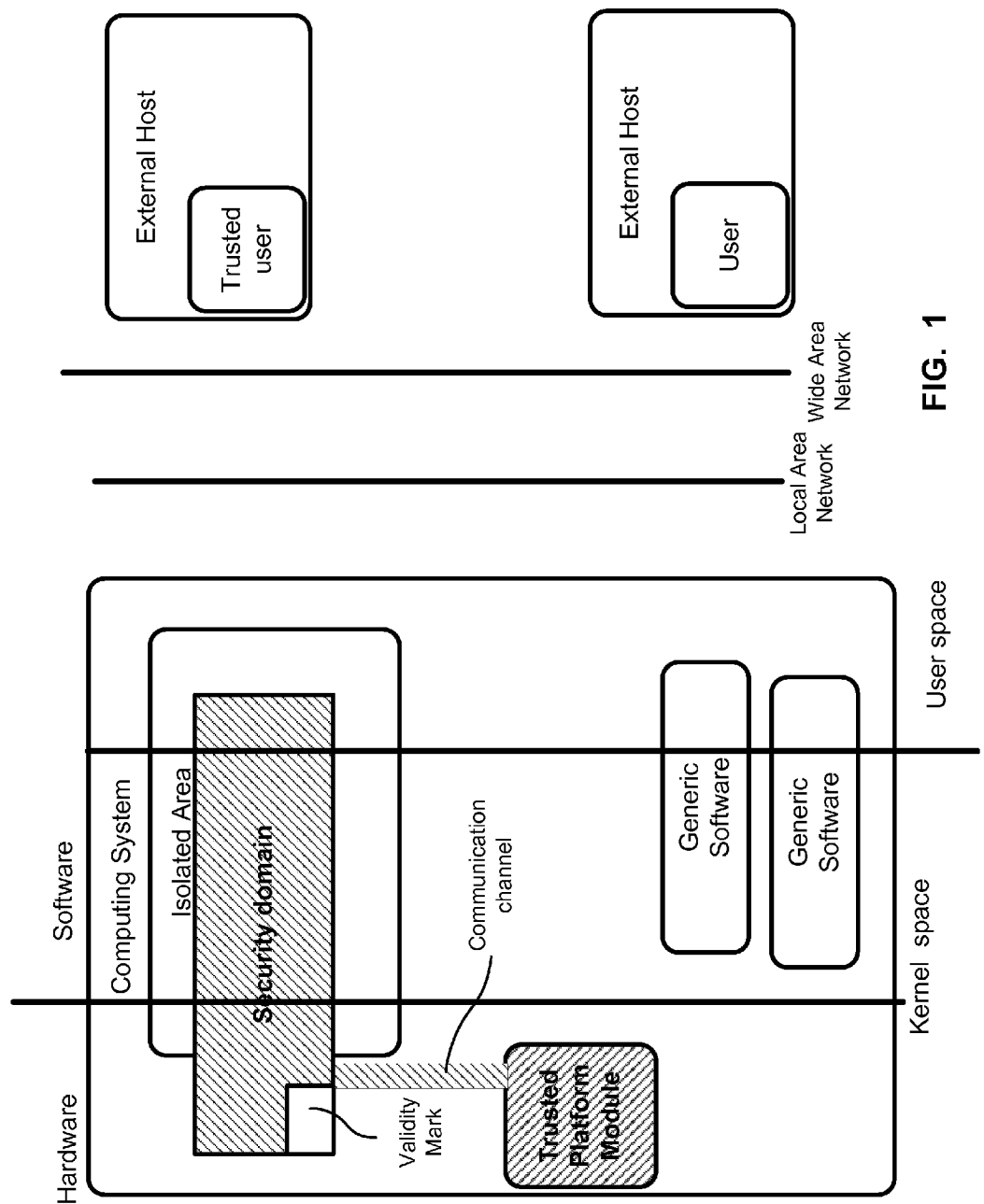
FIG. 1 illustrates an initial condition of a created security domain.
Figure 2:
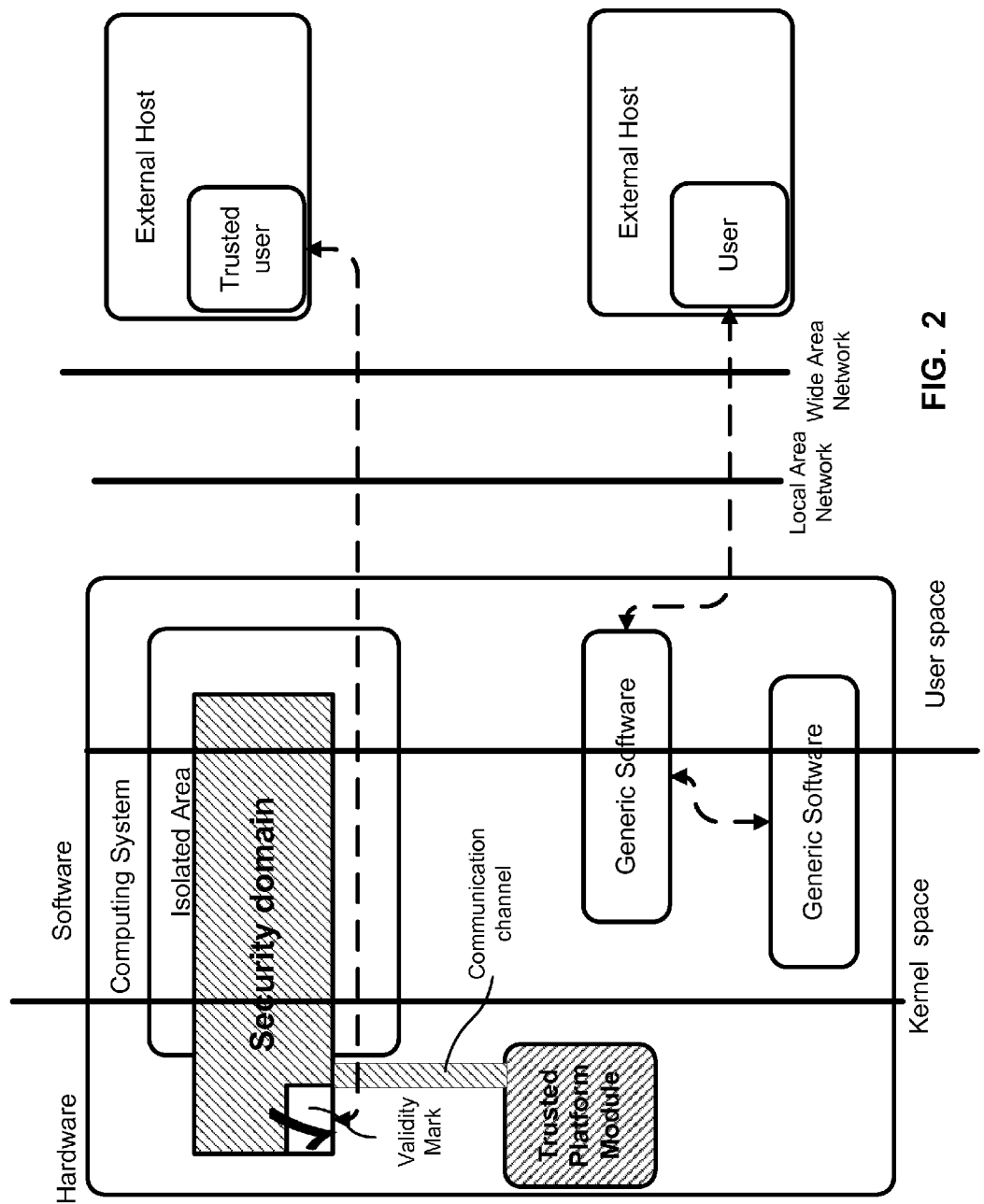
FIG. 2 shows a generic user uses generic process in a secure way, where the trusted user sees a valid security domain.
Figure 3:
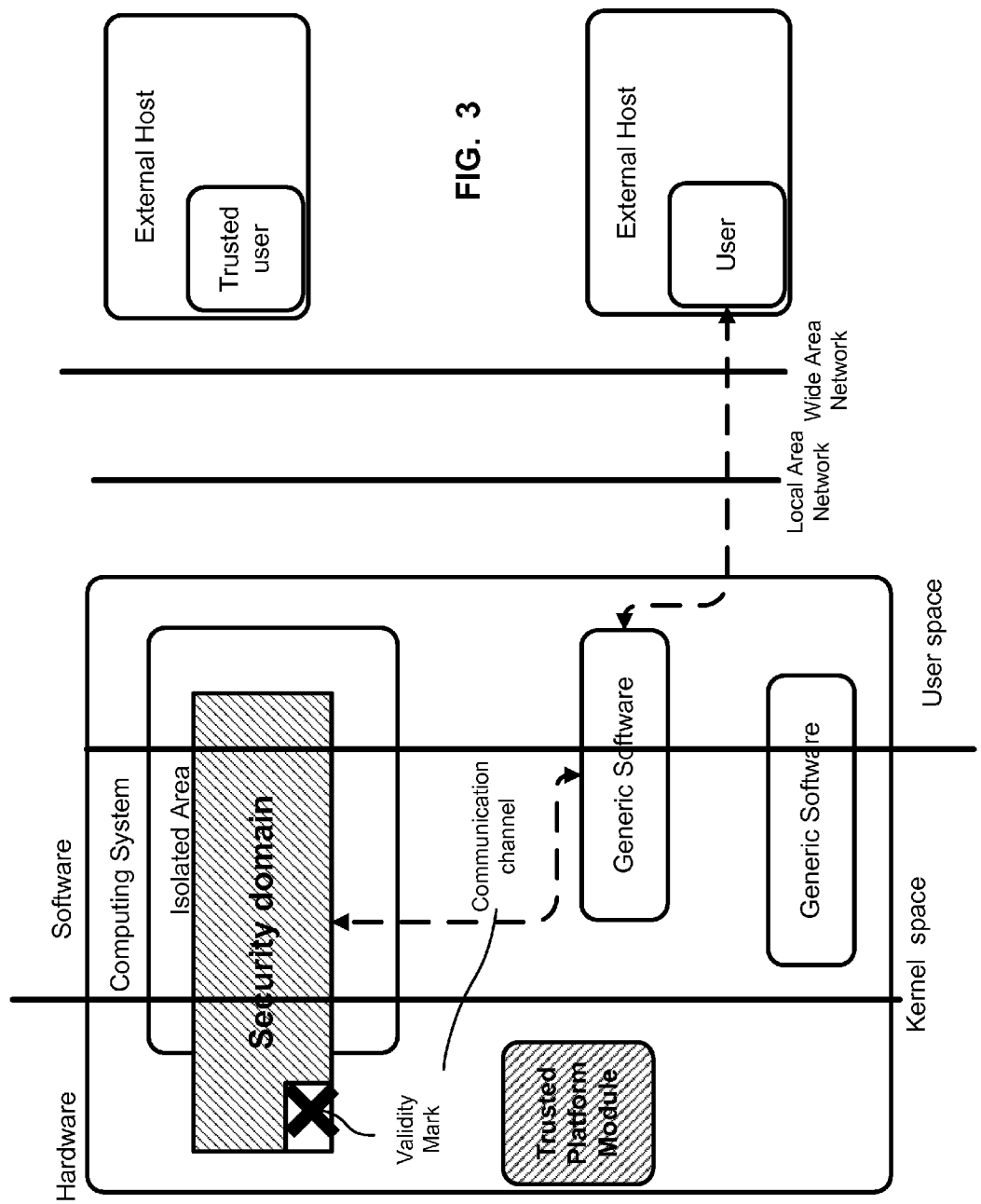
FIG. 3 shows how generic user uses generic process in unsecure way, and the trusted user sees invalid secure domain (the TPM module is unavailable).
Figure 4:
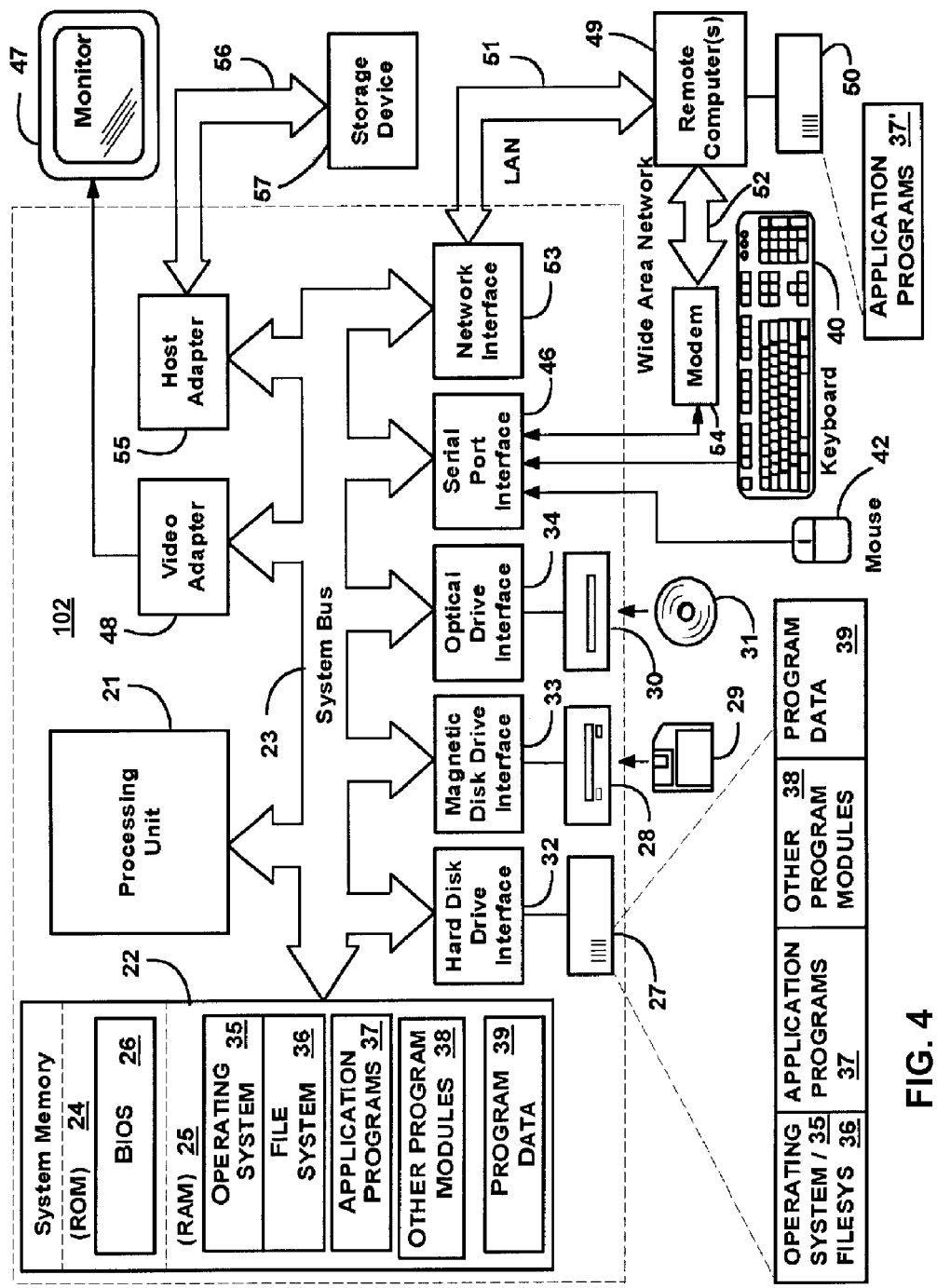
FIG. 4 illustrates a schematic of an exemplary computer system that can be used for implementation of the invention.

Reference will now be made in detail to the preferred embodiments of the present invention, examples of which are illustrated in the accompanying drawings.

In one aspect of the invention, there is provided a system, method and computer program product for implementing a security domain within Virtual Machines (VMs) implemented on the host computer system.

According to the exemplary embodiment, an isolated security domain is a bounded area of the VM for protected objects. The objects are software units (including executable code data), hardware units (e.g., ports) or a combination thereof. The secure units in this area are accessible using secure rules used to ensure that objects are not malware.

A security domain can be implemented on a physical machine and used by several VMs implemented on the physical machine. Alternatively a security domain can be implemented inside one of the VMs and the VM can be distributed over several hardware systems. Communication over secure channels is described in a co-pending patent application Ser. No. 12/359,353 entitled "Network Interface Within A Designated Virtual Execution Environment", incorporated herein by reference in its entirety.

According to the exemplary embodiment, in a non-trusted system user space applications (e.g., pages with code and data), kernel space utilities, drivers (e.g., TCP stack and network cards) are combined into a protected (i.e., read-only (RO)) area. Thus, a user can be mathematically assured that these objects are secure until modification of any related object. In other words, a security domain with a short-living time is created inside an insecure (i.e., infected) environment using some anchor (i.e., a root of trust, such as, for example Intel TXT late launch/measured execution, or SecureVM (SVM) from AMD). As one example, only code in the security domain can access the TPM (trust protected module) register.

Creation of the security domain does not require virtualization support in hardware and is suitable for generic OS root of trust. The OS root of trust can be configured as follows: trust the entire host OS, or trust a particular driver, or trust a particular user, etc.

The protection can be complete (no access at all), read only for all, read only for everything, but read/write for domain code. Part of domain data can be made inaccessible from the outside or it can be accessible on the execute-only basis.

When a set of objects is combined into a temporary trusted domain, the domain is identified by some unique means or a unique identifier. A set of domain users is explicitly defined. Examples of guest or host objects encapsulated into the security domain are:

a virtual memory page;
a physical page;
a disk block;
a file or a part of a file with optional metadata;
a table of exports (dlls, shared librarys, etc.);
an interrupts table;
a shared memory page;
a pagefile page (or a memory mapped file page);
configuration data which is processed during execution of domain code;
I/O address range;
DMA region;
CR3 map (PDE/PTE/etc.);
EPT map;
PCI devices/bus/etc.;
USB bus;
video card;
GPU;
fire-wire bus;
wireless devices/storage/infiniband/SAN/etc.

Each separate unit of the execution environment acts as a separate member of the domain and security is provided for each unit using a set of rules. The rules include communication rule—communication inside the domain is always protected. Also, access rules—read only from outside the domain and writes from inside domain only. As an example, copy on write or copy on open can be used for bringing new objects outside the domain.

According to the exemplary embodiment, the domain boundaries can be provided by hardware means such as a selected data bus or a selected hardware-implemented VM. The domain boundaries can be implemented using software means, such as authentication, assigning IDs to the group of processes, etc.

The domain isolation means that while execution of the domain code only code and data from inside the domain objects can be used (write can be performed outside of the domain). It can be implemented by using API for system OS calls, code, data, user space, etc.

The security domain has a validity indicator (i.e., flag) that changes if any data or code or an object state inside the domain change. Any significant changes make the domain invalid. A set of security rules is established and each action outside the rule set changes a status of the whole domain. For example, forced write to the restricted area can cause hash table inconsistence and invokes change of validity flag of the domain.

According to the exemplary embodiment, the security domains are distinguished from one another. Even if the objects inside the domains are the same, the domains should be recognized as different by a unique ID, a time stamp, a crypto-signed certificate or other crypto data, a hardware state, a register value, etc. The domains can be implemented using IA64 memory tags.

The domains are established automatically by compounding a set of secure data related to valid secure units. The units inside the domain are valid at leas until the first read or write application. In one embodiment, new objects can be simply added to the domain or can be used to replace old objects. Alternatively, addition of objects can be disallowed in some domains having a very short life cycle.

Domain validation can be performed using a hardware register, a verifiable API, an external source of validity, a response from a hypervisor/host OS/external server/part of guest OS/hardware platform/AMT/vPro/OOB subsystem/TPM registers/etc. The validation procedure can add a unique stamp to some data used for operations with the domain.

For example, a trusted part of a solution can be added to the domain to create a set of pages with driver code/data only in case of validity of the domain. In other words an application requests for creation of the domain and, if it is not trusted, the domain will not include driver code for communication with the network/USB device/etc.

The security domain provides conditional access to hardware resources and pages necessary for communications means such as SSL session handling (including establishing new session or joining the existing session). A dynamic connect/disconnect to the domain can be implemented. For example the domain can be connected to a secure session including a set of TCP stack pages, nw buffers and sockets connected to a particular client).

According to the exemplary embodiment, the domain is implemented based on the VM with a hypervisor using Intel VT-x, EPT, TXT and guest tools as a trusted communication means (or similar technologies from other manufacturers) for connecting to the computers based on domain ID. The domain invalidation procedure includes memory/objects clearance (such as SecCLEAR in TXT) operations to avoid leaking of data to unsecure environment. Herein in the invention "the memory" preferably means hardware memory space, but in some cases paging file data or similar structures may be treated. A life of the domain can be very short, just a few cycles of CPU, or until secure data transmission. While recreation of the domain, the verification can be performed for each key pressed. A hierarchy of the domains can be created using permanent or long-life domains that create and handle other domains until the next secure trusted boot procedure.

The security domains can be used for audit trail (i.e., writing or attaching for each operation a tag or ID of the domain that performed the operation. For example, TPM can be used for tagging (write operation id plus domain plus id sequence number are used for receiving a signature from TPM PCR). This allows tracking the operations on "low-level" below a user authorized level—a level of a particular driver, an application, code page of application (which can be ejected externally using standard OS API).

In addition to executing the insecure applications in a Virtual Environment, a software patching problem exists. Software patching always raises problems of placing a path code, write ability to code pages, overcoming artificial barriers such as a patch guard in MS WINDOWS/etc.

Often patching is used to avoid performance-related problems. For example, using VM and hardware-assist virtualization events related to exit are encountered (i.e., context switch, VMEXIT, etc) by the virtualization monitor. For example, a guest code uses TPR (task priority register) from the Intel platform to perform some operations, and these operation can be used 100000 times per each second (i.e., Raise IRQL operation in MS WINDOWS kernel).

If a standard VT-x support is used, each access to TPR in a guest system leads to a heavy-overhead VMEXIT operation. The exemplary embodiment proposes a light weight VMEXIT support, which does not require a heavy-overhead transition to a VMEXIT handler. Instead, it just "jumps" into the guest OS handler, which does not require a context switch (it can switch to guest OS kernel space from user space, from ring 3 to ring 0, or even without switching, jumping to pre-defined place in a guest system). This mechanism is similar to interrupt handler or even sysenter/sysexit handler of the Intel platform.

The benefits are: instead of a full switch to monitor or VMM or hypervisor, the system switches (jumps) to pre-defined procedure that knows what to do in such a case and can handle operations more efficiently. The same idea can be used for working in commodity OS without virtualization support, as a way to handle hot updates. Instead of patching the code, some events are established and invoke the code to change the IP register (similar to jump) when a specific condition is met.

For example, when IP address equals a particular value, it is switched to another value—a gateway to pre-defined handling routine (see above). This allows for hot-patching without real update of the code pages. Yet another example of condition—some event occurs (e.g. interrupt "int 3" instruction hit) and instead goes to standard event handler (such as, for example, Intel handler, sysexit handler, page fault handler/etc.)

The system jumps to a pre-defined place in different or the same protection ring and space. This is applicable for paging mode, as well as non-paging mode of x86 and other hardware architectures. Implementation can be done on processor instruction level (in hardware—e.g. with table of event addresses with restrictions like execution condition), or inside VM/VMM/hypervisor interpreter.

In an alternative embodiment of the invention, a protected/secure guest operating system is created. As one option, this can be an image of a virtual machine that is stored on a trusted medium, such as a CD ROM or similar, where there is a high degree of certainty that the image could not have been corrupted. Inside the guest OS, a temporary, relatively short-lived protected zone is created, such that an unsanctioned access to the security domain will lead to an impossibility of using the security domain in the future (where the purpose of the security domain is defined at its creation). For example, if the security domain has failed, cure of the host system from malware may be provided, registry settings may be changed, degree of isolation of the guest system may be performed, etc. Security domain is preferably created for a specific occasion, where the function it needs to be perform can be done in an entirely predictable and secure manner. It may be, for example, a boot loader for restarting system, software loader for loading antivirus or encrypted software, a scrambler—descrambler for secure communication, a reader and transmitted of code from the hidden (secure) area, etc.

As one example, reads to the security domain can be permitted, but writes are not permitted. A write to the security domain would trigger the actions above. As yet another option, an attempt to write to the security domain (regardless of whether it is successful or not) can be treated as evidence of compromised security, and the security domain can no longer be used for the intended purpose.

In other words, the user of the security domain or the computer or process associated with the user, when accessing the data or otherwise using the security domain, can be certain that the data has not been compromised or corrupted, and the use of the security domain satisfies the security requirements.

The security domain might be not completely isolated from the host operating system, but attempts for unauthorized access would be detected. For example, once the isolated area is created and code is moved to it, any attempts to change the code or invoke the code from an "unexpected" location would be detected. When this happens, then the security domain is considered invalid, and then another attempt to create domain is made. When a cause of domain "invalidation" can be recognized, then additional protected areas may be constructed. With multiple mutually isolated domains, it can be assumed that all the domains on the system could not be broken. However, note that the attempt to affect the security domain in an unauthorized manner will lead to the security domain becoming unusable for its intended purpose.

As one example, invalidation of the security domain is the intended result that the user would like to see when the security domain is tested by an external system. The worst-case scenario is that the security domain has to perform a specific task. If it fails, this indicates that the system is corrupted and either an updated security domain should be used, or the system should be cured of infection or corruption. Validation or invalidation of the security domain is performed either by calculating a control sum (such as hashes, cyclic redundancy checks, etc.), or by loading verification code from a particular location, such that the code, once loaded, enables the use of the security domain in the future. For example, the security domain can be used to embed a digital signature in a file. As an example, the certificate required for digital signature may be stored in secure place in encoded form. Reading and decoding of the certificate should be done from the security domain. If malware intrudes in the process, the certificate became invalid.

As another example. The security domain contains all data and instructions for providing the digital signature. The digital signature and the security domain is used for secure transmission of data. As another example, the security domain can generate the results of an integrity check of some external system, from the perspective of virus identification, including identified viruses and removed viruses if the security domain is invalidated, the result, in one option, can be viewed as analogous to detecting a virus. For example, if a virus is detected and removed from the security domain, this is recorded in a report or a log. If the virus corrupts an area checked by the security domain, that area is considered unsafe, and additional steps are performed. The short-lived security domain can be authorized to perform those actions that are necessary to support or create other security domain, for example, for the Intel TXT technology.

The code of the security domain can be open for reading, but not for writing. Optionally, copying the code of the security domain can also be prohibited, to prevent domain substitution.

The security domain can have a location to which the code can write, and to which code that functions under control of the security domain can also write. However, writes by other code (which is not under the control of the security domain) is prohibited. As one example, when the system (i.e., thedata memory area and the executable code area) is modified by an unauthorized source, the digital signature is changed, and any results of the work by the security domain code is treated as invalid.

As another embodiment, it is possible to use the security domain to read the password from another security domain (memory area). If the other security domain was checked for security by a program that is itself regarded as unsecure, then the contents of the other security domain is invalidated. The first security domain constantly keeps another security domain available for reading. If a memory area is read by another program, e.g., each reading should accompanied by rewriting of the digital signature, then the memory area is invalidated by the first domain.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A computer-implemented method of generating a security domain, the method comprising:
   defining the security domain representing a bounded area of a Virtual Machine for storing protected objects of the Virtual Machine to provide conditional access to a Trusted Platform Module (TMP) register,
   the security domain including kernel-space and user-space objects, and having a flag indicating the validity of the security domain;
   allocating a memory space to a security domain, defining a root of trust area and associating computer resources with the security domain, such that the root of trust is guaranteed to be secure upon initialization of the security domain;
   initializing the security domain using the root of trust, the security domain utilizing the memory space;
   loading executable code into the security domain and the memory space;
   allowing the executable code in the security domain access to the physical resources;
   giving the executable code in the security domain permission to access the memory space; and
   upon an attempt of illegal access to the memory space, setting the validity flag to indicate invalidity and invalidating the security domain;
   wherein the domain invalidation is detectable by a user, and
   wherein, as long as the validity flag does not indicate invalidity, data stored in the memory space is known to be uncompromised.

2. The method of claim 1, further comprising starting another security domain in the memory space after the invalidating.

3. The method of claim 1, wherein a second security domain takes over functions of the security domain after the invalidating.

4. The method of claim 1, wherein the executable code in the security domain includes operating system function calls.

5. The method of claim 1, wherein the executable code in the security domain includes operating system function Application Process Interfaces (APIs).

6. The method of claim 1, wherein the executable code in the security domain includes operating system function services.

7. The method of claim 1, wherein the executable code is downloaded from a remote server.

8. The method of claim 1, wherein the security domain controls any of the following resources:
   operating system objects in user space;
   objects in kernel space;
   a virtual memory page;
   a physical page;
   a disk block;
   a file;
   a portion of a file; and
   file metadata.

9. The method of claim 1, wherein the security domain controls any of the following resources:
   page tables, including:
   page mapping tables;
   a Page Descriptor Entry (PDE);
   PTE;
   a Page Table Entry (PTE);
   a table of exports, including any of Dynamically Linked Libraries (DLLs) and shared libraries;
   an interrupts table;
   a shared memory page;
   a page file page; and
   a memory mapped file page.

10. The method of claim 1, wherein the security domain controls any of the following resources:
    configuration data which is processed during execution of domain code;
    an Input/Output (I/O) address range;
    a DMA (direct memory access) region;
    a Control Register 3 (CR3) map;
    hardware registers, including control registers;
    Advanced Programmable Interrupt Controller (APIC);
    Basic Input-Output System (BIOS) data;
    Extensible Firmware Interface (EFI) data; and
    an EPT map.

11. The method of claim 1, wherein the security domain controls any of the following resources:
    Peripheral Component Interface (PCI) devices;
    a memory bus;
    a Universal Serial Bus (USB);
    USB devices;
    a video card;
    a Graphical Processing Unit (GPU);
    a fire-wire bus;
    a fire-wire devices;
    a wireless device;
    a storage device;
    an infiniband device;
    a storage area network;
    coprocessors;
    processors extensions; and
    accelerator engines.

12. The method of claim 1, wherein the security domain controls access to logical and physical resources.

13. The method of claim 1, wherein the executable control includes Virtual Machine code.

14. The method of claim 1, wherein the executable control includes hypervisor code.

15. The method of claim 1, wherein the root of trust is launched after a host operating system (OS) is loaded into memory.

16. The method of claim 1, wherein initializing the security domain and loading executable code into the security domain and the memory space is performed as an atomic operation.

17. The method of claim 1, further comprising allowing a piece of code outside the memory space to access the memory space.

18. The method of claim 1, wherein allowed access includes write to the memory space and/or reading from memory space and/or transferring control to the executable code in the memory space.

19. The method of claim 1, wherein security of the root of trust is guaranteed by utilization of hardware support.

20. The method of claim 19, wherein the hardware support includes any of:
   Intel® Trusted Execution Technology;
   AMD Secure Virtual Machine;
   SecurCore processor;
   ARM TrustZone;
   Dallas Lock system personal identifier;
   Smart Card reader;
   Biometric identification hardware;
   Universal Serial Bus (USB) key; and
   Radio Frequency ID (RFID) identifier.

21. The method of claim 1, wherein the physical resources include:
   Trusted Platform Module registers;
   a Universal Serial Bus (USB) key;
   a Dallas lock key;
   SMART cards; and
   other secure areas.

22. The method of claim 1, wherein the security domain is used for any of:
   remote verification of a computing system's assets and data center, including verification of hardware and installed software;
   secure wallet, banking and/or other databases access;
   secure certificate storage access; and
   secure antivirus and firewall implementation;
   access control means.

23. The method of claim 1, wherein the domain invalidation includes a restriction for accessing the physical resources.

24. The method of claim 1, wherein the executable code is isolated from the Host Operating System (OS).

25. The method of claim 1, further comprising analyzing each access attempt to the memory space, and invalidating the security domain if the access attempt is illegal, wherein the illegal access attempt includes any of (a) write to the memory space (b) a read from memory space and (c) transferring control to the memory space.

26. The method of claim 25, wherein the analyzing is performed using hardware means.

27. The method of claim 25, wherein the access attempt is made from outside the security domain.

28. The method of claim 1, wherein the security domain invalidation includes memory clearance.

29. The method of claim 1, wherein the security domain is established automatically by compounding a set of secure data related to valid secure units.

30. The method of claim 1, wherein the security domain invalidation includes memory/objects clearance.

31. A system for generating a security domain on a computer having a processor and a memory, the system comprising:
   a security domain representing a bounded area of a Virtual Machine for storing protected objects of the Virtual Machine to provide conditional access to a Trusted Platform Module (TMP) register,
   the security domain including kernel-space and user space-objects, and having a flag indicating the validity of the security domain
   a memory space in the memory allocated allocate to the security domain,
   a root of trust area having computer resources associated with the security domain, such that the root of trust is guaranteed to be secure upon initialization of the security domain;
   executable code loaded into the security domain and the memory space, such that the executable code in the security domain is permitted access to the physical resources to the memory space; and
   the security domain being invalidated upon an attempt of illegal access to the memory space, and the validity flag being set to indicate invalidity and the domain invalidation being detectable by a user and
   wherein, as long as the validity flag does not indicate invalidity, data stored in the memory space is known to be uncompromised.

* * * * *